United States Patent [19]

Anderson et al.

[11] 4,129,205
[45] Dec. 12, 1978

[54] METHOD AND ASSEMBLY FOR FEEDING ARTICLES

[75] Inventors: Andrew W. Anderson, West Caldwell; Milan Mateyka, Union, both of N.J.

[73] Assignee: Scandia Packaging Machinery Company, Clifton, N.J.

[21] Appl. No.: 800,398

[22] Filed: May 25, 1977

[51] Int. Cl.$^2$ ............................................. B65G 43/00
[52] U.S. Cl. .................................... 198/358; 198/366; 198/448
[58] Field of Search ............... 198/358, 366, 448, 449, 198/452, 540, 547, 562, 616, 359; 271/9; 214/8.5 R, 8.5 G; 53/59 R; 221/14, 110, 123, 131, 253

[56] References Cited

U.S. PATENT DOCUMENTS

| 1,814,795 | 7/1931 | Giles | 221/110 |
|---|---|---|---|
| 2,578,545 | 12/1951 | Haase et al. | 221/253 |
| 2,905,295 | 9/1959 | Anderson et al. | 193/46 |
| 3,972,407 | 8/1976 | Kushigian | 198/540 |

Primary Examiner—Evon C. Blunk
Assistant Examiner—Joseph E. Valenza
Attorney, Agent, or Firm—Neil F. Markva

[57] ABSTRACT

A method and assembly for providing a continuous supply of articles incorporate the use of an auxiliary supply operating together with a primary or main supply of articles. The main supply of articles is disposed in a stack over an article introducing position. First conveying means moves articles from the article introducing position to a subsequent working station. Second conveying means moves articles into the article introducing position immediately behind said first conveying means to insert an article beneath the stack while maintaining the total number of articles in said stack. That is, the bottommost article in the stack is simply replaced without depleting any of the articles in the stack disposed within the primary or main supply of articles.

19 Claims, 10 Drawing Figures

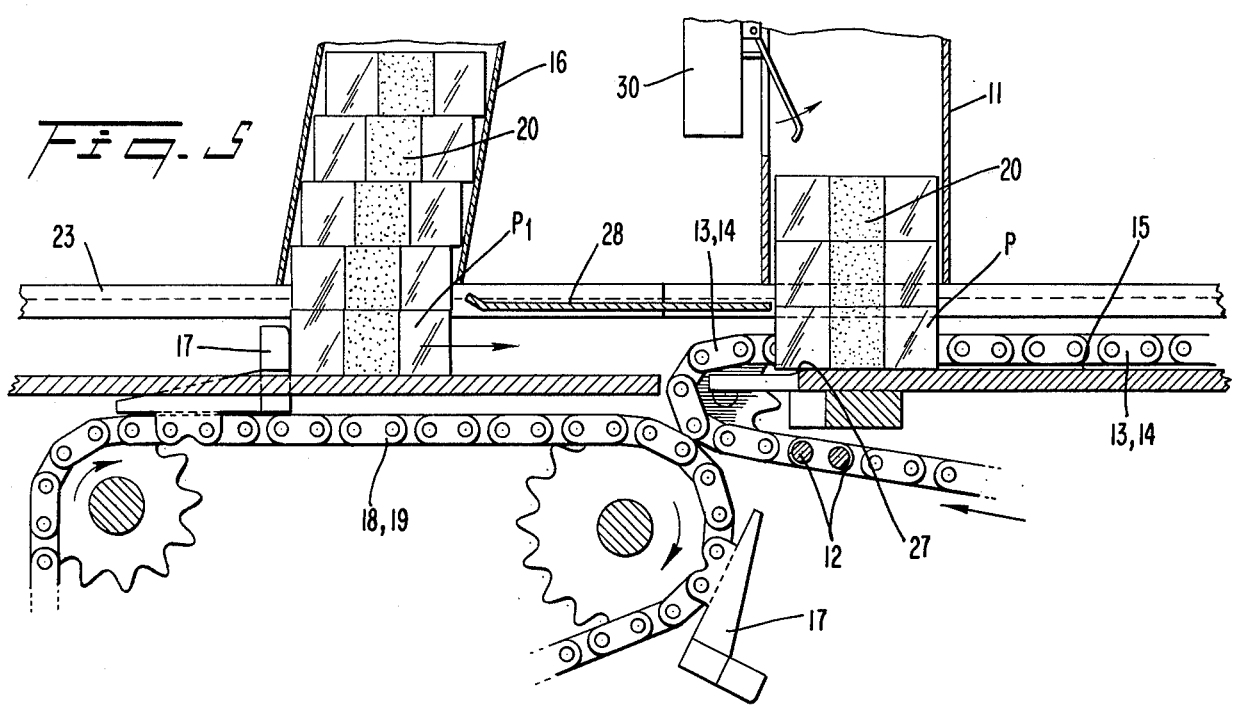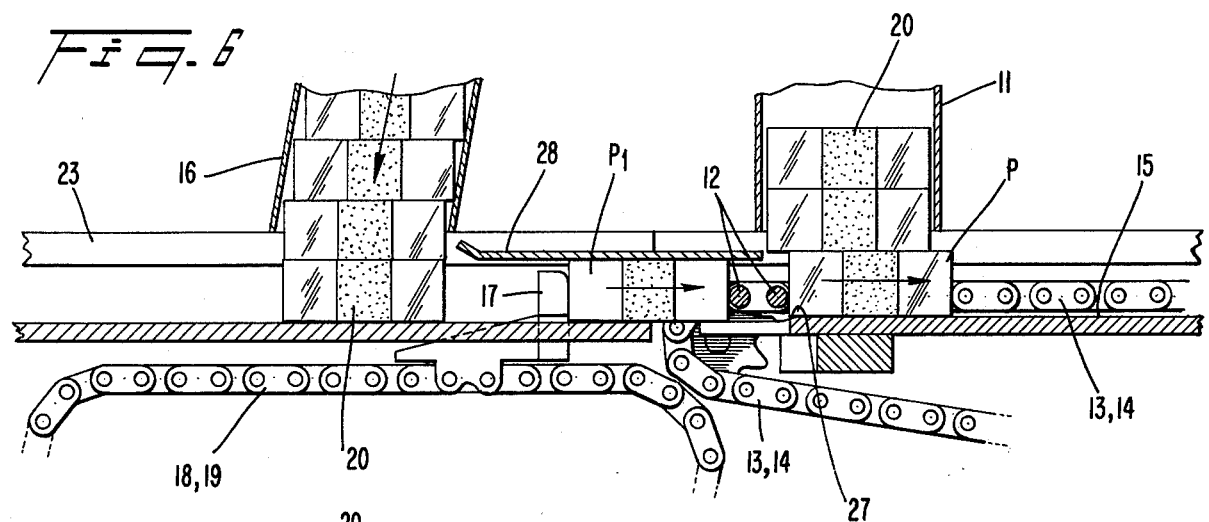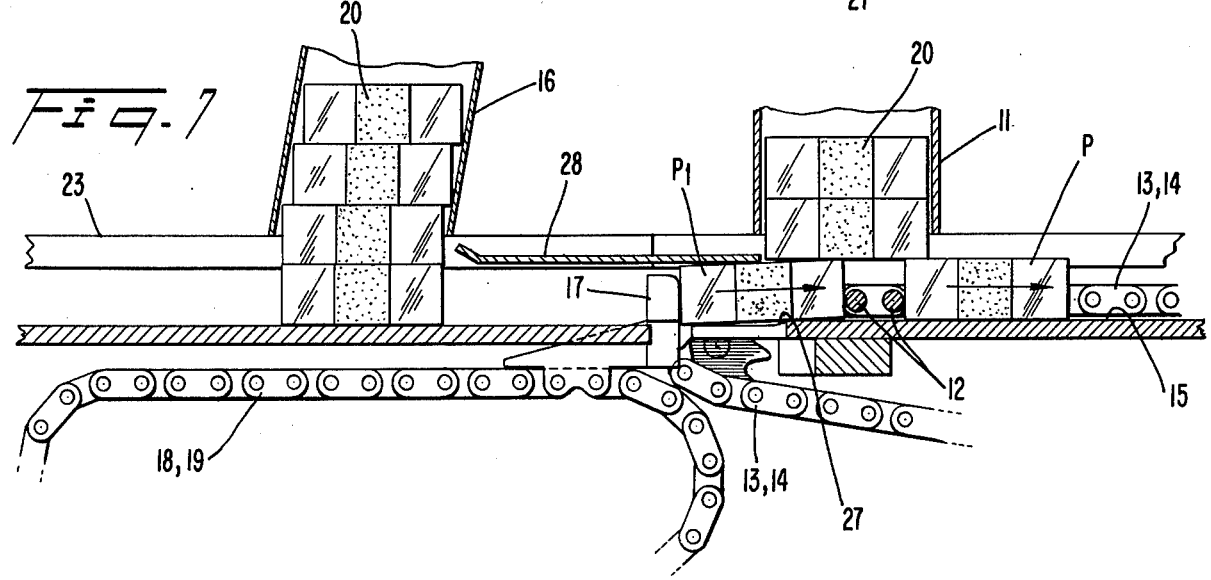

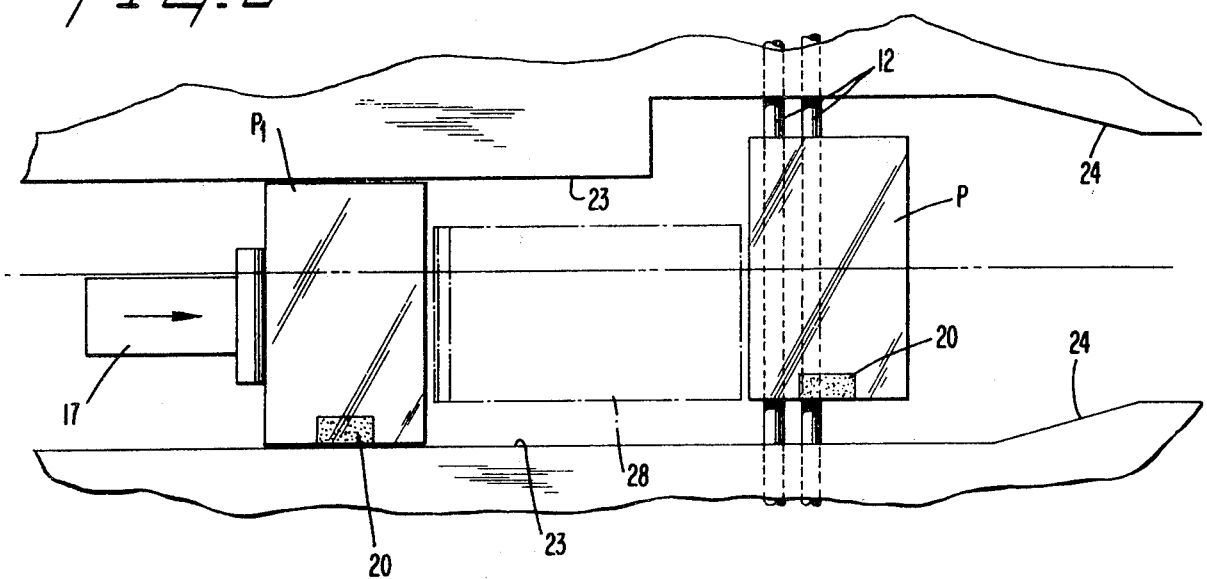
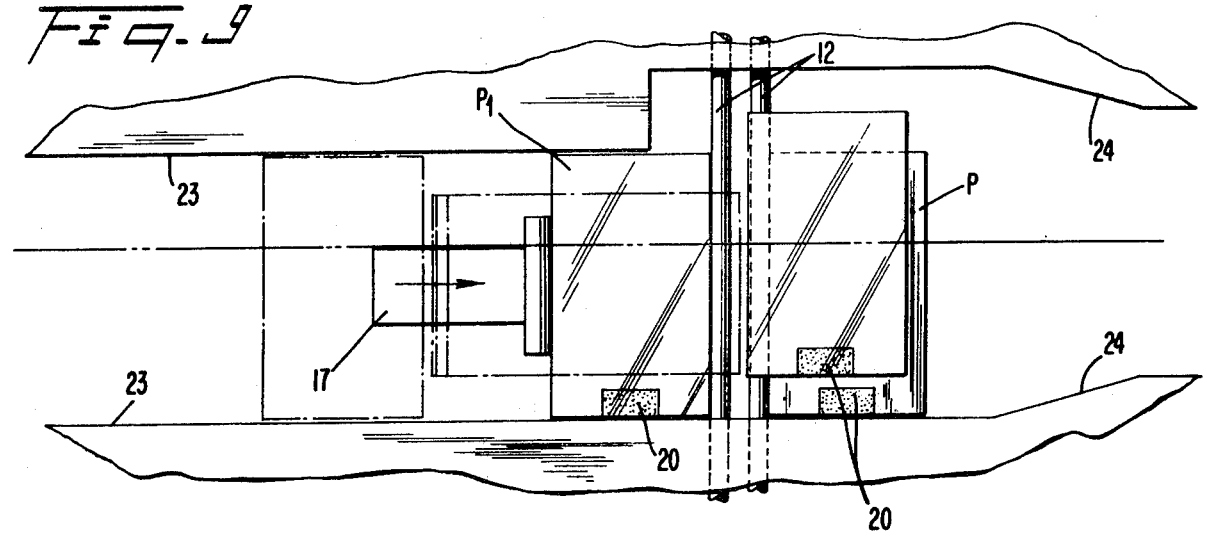
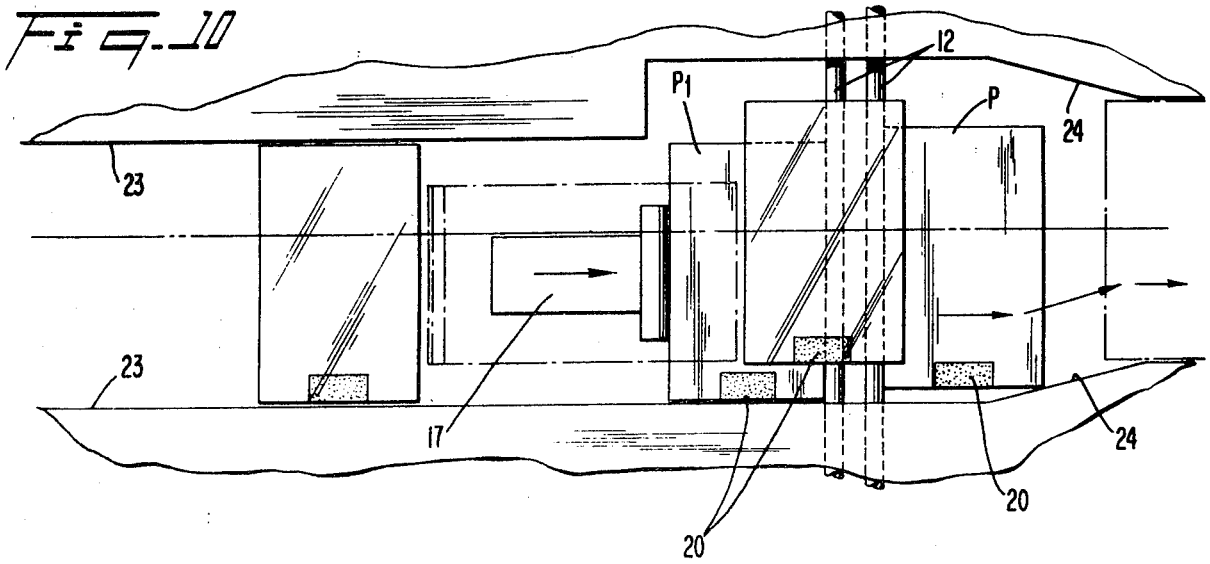

METHOD AND ASSEMBLY FOR FEEDING ARTICLES

BACKGROUND OF THE INVENTION

This invention relates to a method and an apparatus for providing a continuous supply of articles. More particularly, the invention is used in package wrapping machines.

Articles such as food and tobacco products are commonly overwrapped as quickly as possible after being manufactured. The wrapping operation is generally faster than the initial production stages. For example, a cigarette packer does not operate as rapidly as a cigarette package overwrapping machine. Thus, there must be a buildup or a stacked supply of packages to be wrapped to keep the overwrapping machine operating continuously. There are several reasons the packer may fall behind its production. Then, the overwrapping machines will experience a shutdown unless a continuous supply of packages to be wrapped is maintained.

PURPOSE OF THE INVENTION

The primary object of this invention is to provide a continuous supply of articles wherein there is a stack of articles being gravity fed to an article introducing position located below the stack.

Another object of this invention is to provide an auxiliary feed assembly for inserting an article into the primary supply conveyor of a wrapping machine without depleting a stack of articles maintained in a main supply mechanism.

A further object of the invention is to provide an auxiliary hopper which will supply packages in a one-to-one timed ratio for a standard pusher assembly operating in a wrapping machine which will not shut down when a supply of packages to the wrapping machine is interrupted.

SUMMARY OF THE INVENTION

These objects and other advantages are accomplished through the method and apparatus for providing a continuous supply of articles as described herein. A first supply means gravity feeds articles from a stack to an article introducing position below the stack. First conveying means moves articles from the article introducing position to a subsequent working position. Second conveying means moves articles into the article introducing position immediately behind the first conveying means to insert an article beneath the stack while maintaining the total number of articles in the stack. The lowermost article of the stack may be simply replaced by inserting an article under the stack before the next preceding article has been completely removed from beneath the stack. Thus, the total number of articles in the stack is not depleted.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIGS. 5, 6 and 7 are fragmentary sectional views showing the operation of the assembly as shown in the drawings; and FIGS. 8, 9 and 10 show the top plan view of the operation of the assembly shown in the drawings corresponding to the operational steps shown in FIGS. 5, 6 and 7, respectively.

DESCRIPTION OF SPECIFIC EMBODIMENTS

Figure 1:
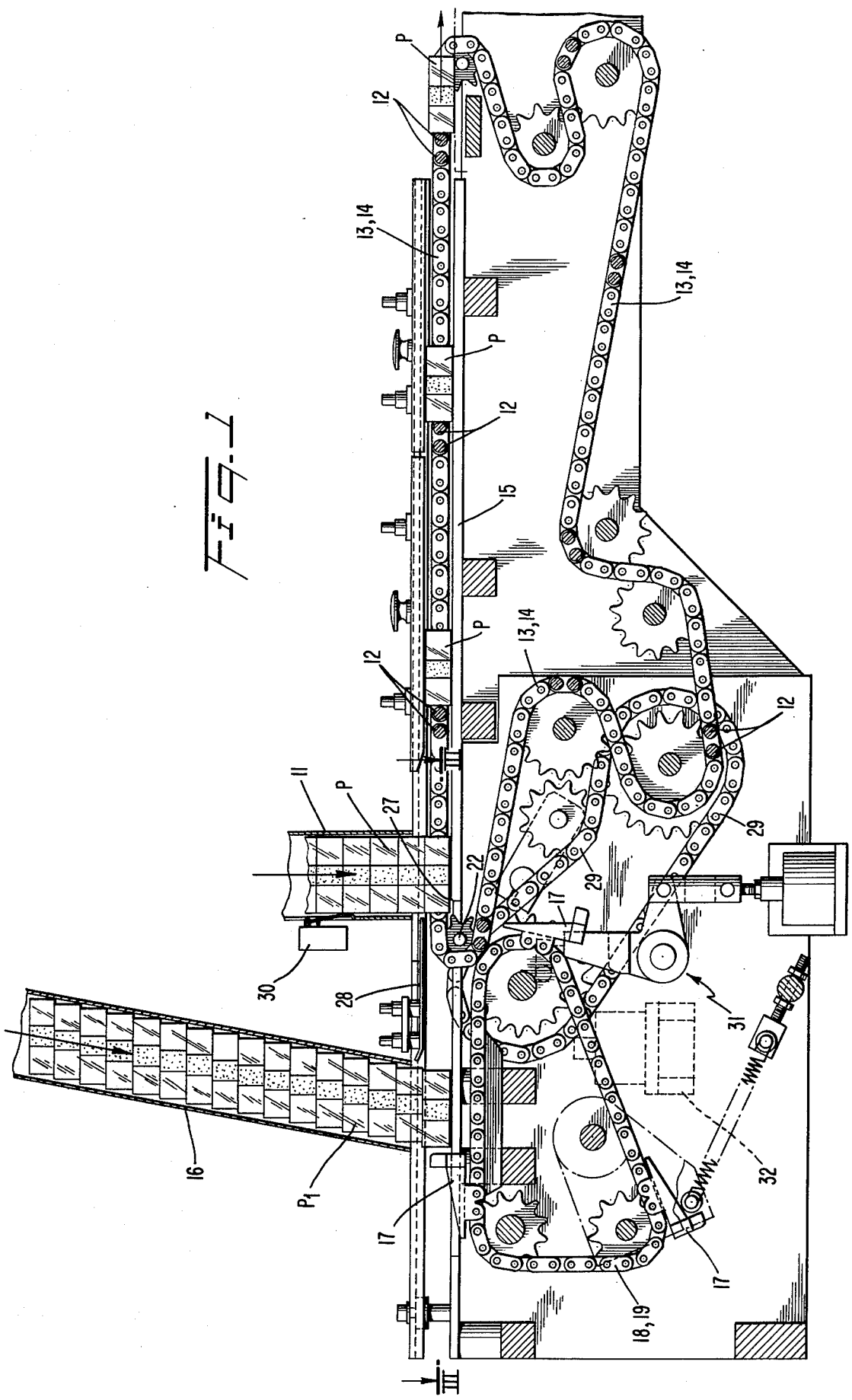
FIG. 1 is a sectional view of an assembly made in accordance with this invention along line I—I of FIG. 2.

More specifically, referring to the drawings, the assembly, generally designated 10, is used to effect a method of providing a continuous supply of articles. In this specific embodiment, the articles are previously packed cigarette packages being taken to an overwrapping station in a packaging machine.

A plurality of packages P are disposed in a stack and gravity fed to an article introducing position located immediately below the stack. In this embodiment, the stack of packages P is maintained in a magazine or supply assembly 11 which provides a 90° twist to the packages being supplied from the packer. A mechanism for turning packages as used in the present application is the type disclosed in U.S. Pat. No. 2,905,295.

A plurality of pusher members 12 are laterally spaced with respect to each other and extend between a pair of closed loop chains 13 and 14. Pusher members 12 move the packages P along the supporting surface 15 disposed in a horizontal plane below the feed mechanism 11. Pusher members 12 carried by chains 13 and 14 intermittently move articles from the article introducing position to the subsequent working position where it is overwrapped in a conventional manner. Chains 13 and 14 are conventionally driven of the main drive of the wrapping machine.

An auxiliary hopper or magazine 16 provides an auxiliary supply of packages $P_1$. When necessary, pushing elements 17 carried by closed loop chains 18 and 19 move articles into the article introducing position immediately behind the pushing elements 12 which take packages P from the article introducing position below the stack in the supply assembly 11. Packages $P_1$ in supply magazine 16 are gravity fed to an auxiliary article supply position below magazine 16 in FIG. 1. In this particular embodiment, articles P and $P_1$ are fed to the respective introducing positions while being maintained contiguously with respect to each other. Thus, there is a frictional contact between the bottommost package and the next package located above in the respective stacks of packages in the supply mechanisms 11 and 16.

Figure 2:
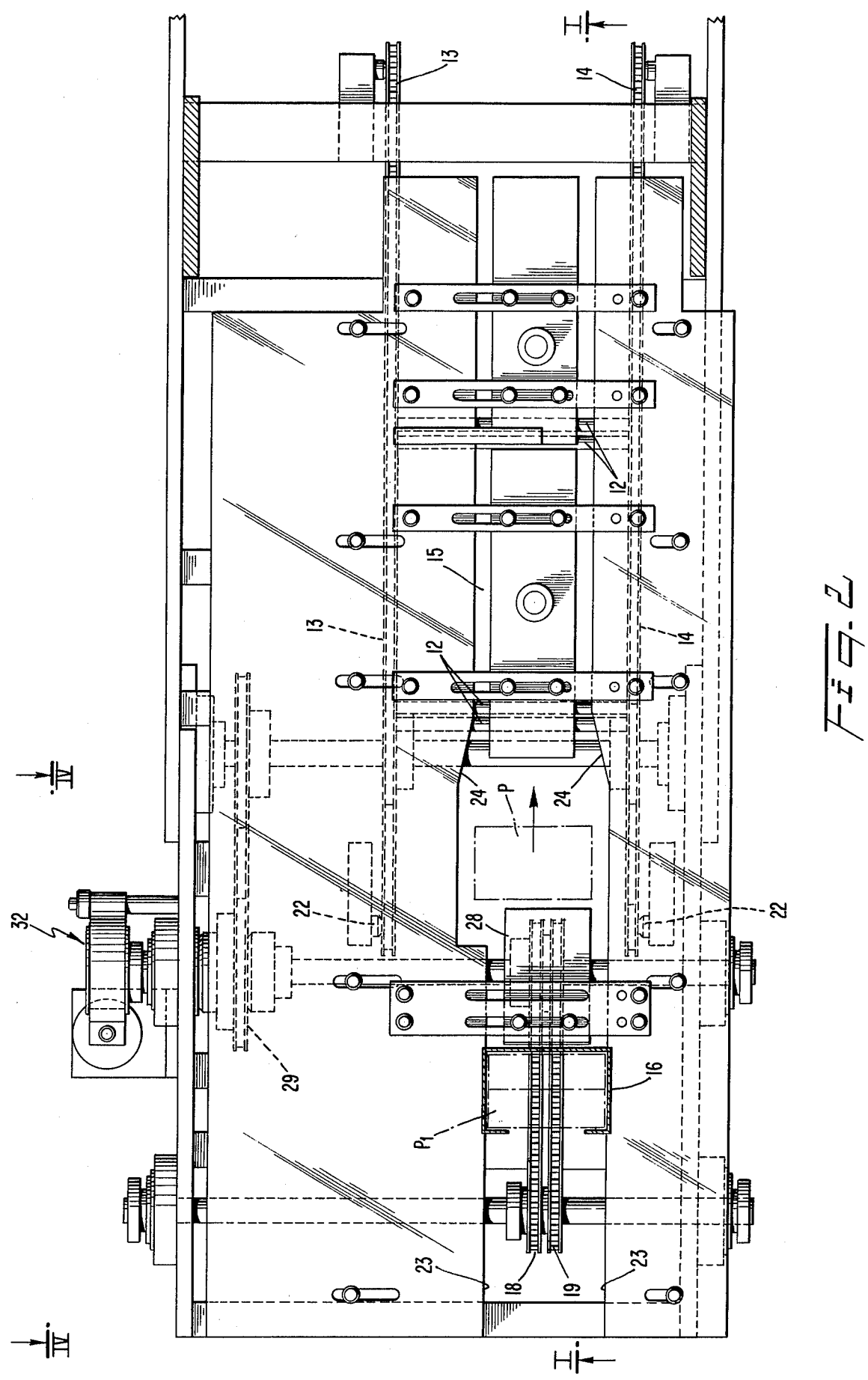
FIG. 2 is a top plan view of the assembly of FIG. 1.
Figure 3:
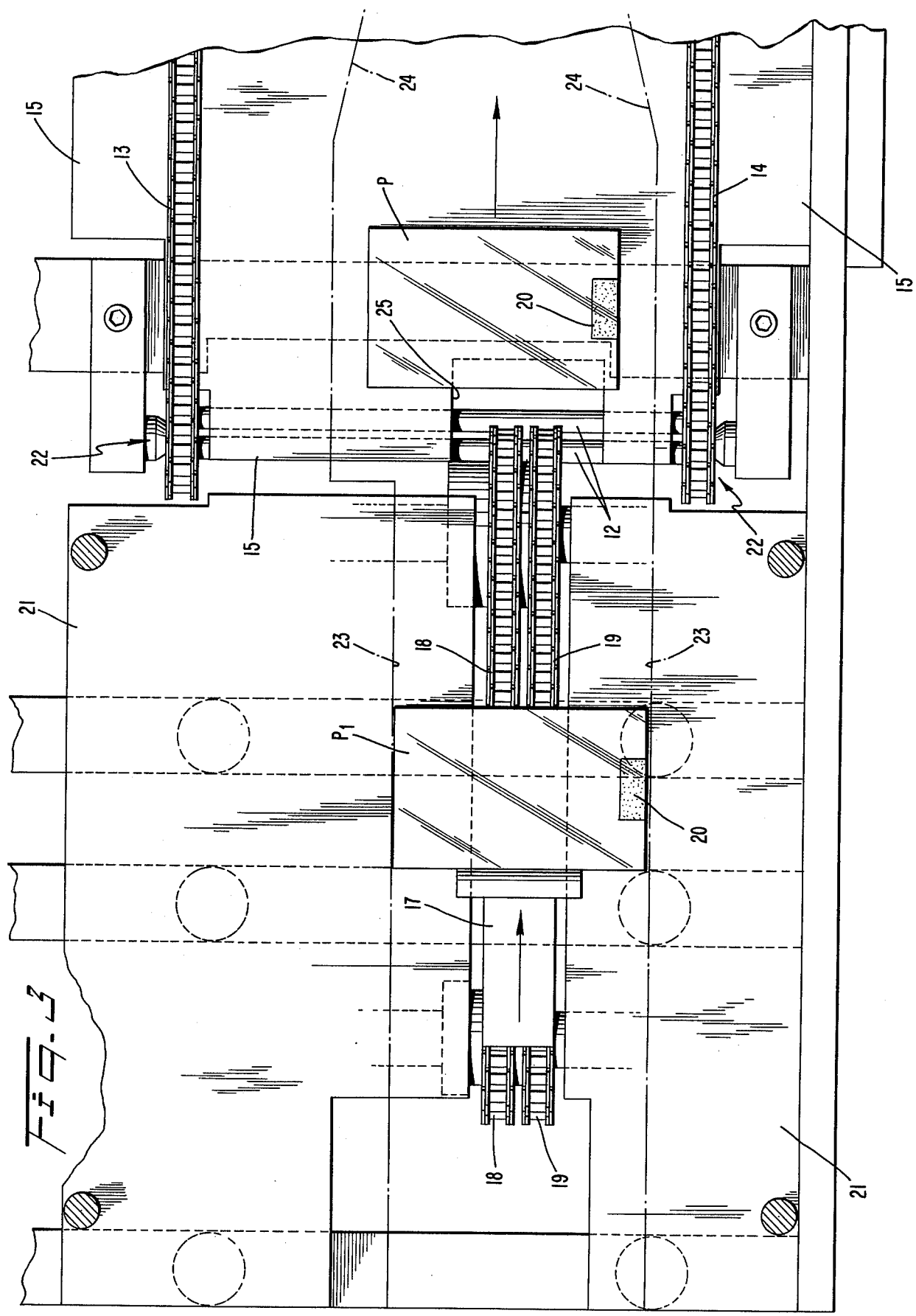
FIG. 3 is a sectional view along line III—III of FIG. 1.
Figure 4:
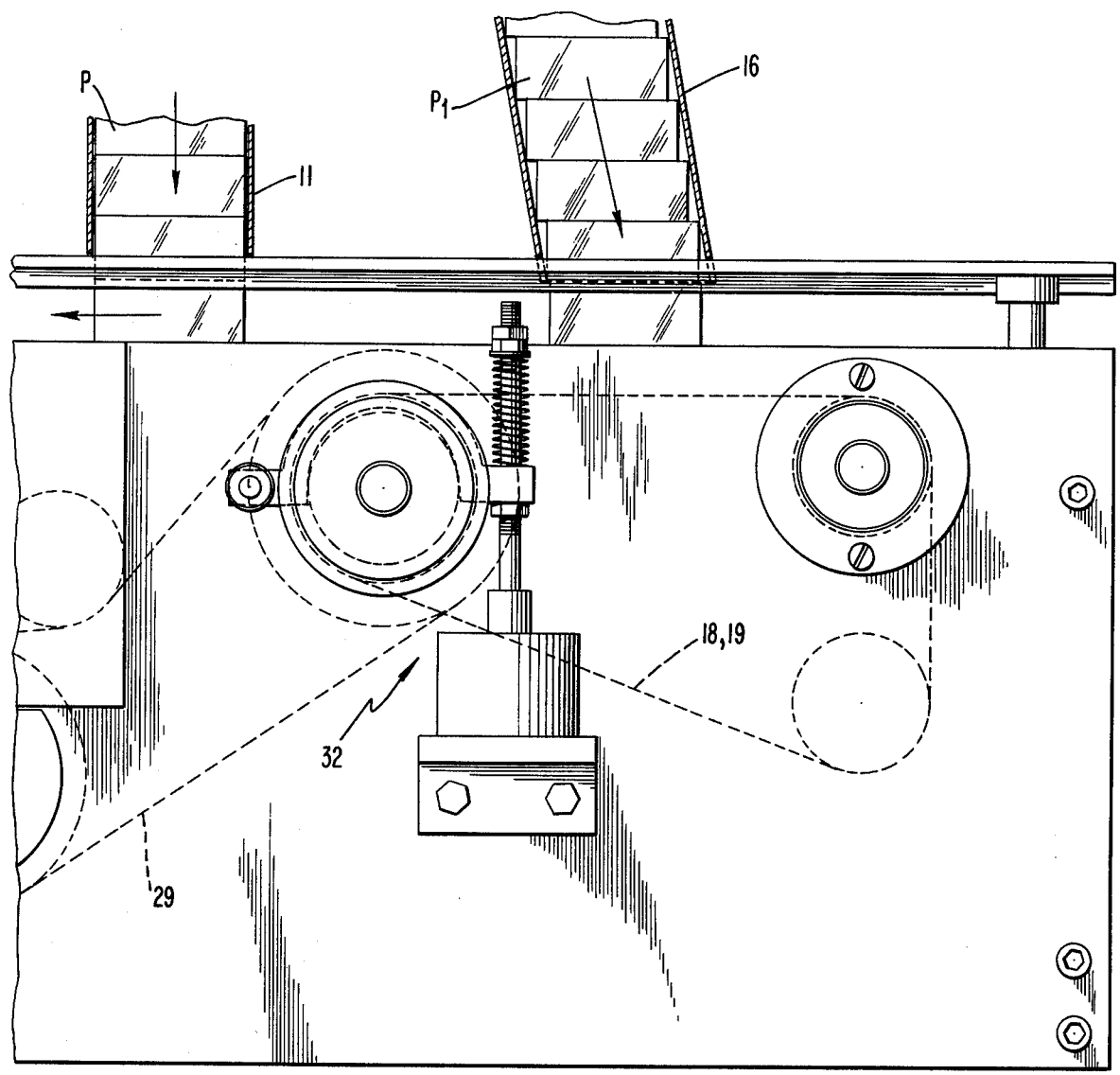
FIG. 4 is an elevational view along IV—IV of FIG. 2.

Referring to FIGS. 2 and 3, packages P and $P_1$ are urged along paths that are offset with respect to each other in the direction of travel toward the subsequent work station. Thus, pushing element 17 urges the package $P_1$ into the article introducing position under supply magazine 11 in an offset manner. Tax stamps 20 have been placed on the packages with adhesive material in the packing operation. The offset auxiliary feed prevents tax stamps 20 from rubbing against each other as package $P_1$ frictionally slides underneath the package next above the bottommost package in the stack of supply magazine 11. This operation is most clearly shown in FIGS. 8 to 10. The guide surfaces 23 insure the appropriate position of package $P_1$ as it enters the article introducing position below the supply mechanism 11. Guide surfaces 24 insure the appropriate travel of the bottommost package as it is pushed into the wrapping machine by pusher members 12.

Chains 13 and 14 are supported by bearing stubs in bearing assemblies 22 located on opposing sides of support platform 15. A cutout 25 in the support surface 15 enables the pushing elements 17 to pass between the chains 13 and 14 and far enough forward to insure the full disposition of the package $P_1$ into the article introducing position beneath supply mechanism 11. The specific interrelationship between the pushing elements 17 and pusher members 12 is more graphically shown in FIGS. 5–7. As shown, package $P_1$ is placed immediately behind the pusher members 12 which are urging the bottommost package of the stack within magazine 11 forward into the subsequent working station.

Package $P_1$ is maintained on a working support surface 21 located in a horizontal plane displaced slightly below another horizontal plane including support surface 15. A cam surface 27 is located just below the stack in magazine 11. Consequently, package $P_1$ enters into the article introducing position while a portion of the bottommost package P in the stack of assembly 11 is still underneath the stack itself. Thus, following package $P_1$ is inserted into the article introducing position without jamming the respective edges of the packages involved in the operation. An upper guide mechanism 28 maintains the incoming package $P_1$ snugly or firmly against the support surface 21 so that control is maintained while package $P_1$ is being moved beneath the stack in magazine 11. That is, a downward pressure is maintained at an amount effective to urge incoming package $P_1$ against support surface 21.

In operation, a sensing device 30 is disposed in a well known manner to determine the presence or absence of a package at a particular level within magazine or supply assembly 11. A clutch mechanism 31 is responsive to the sensing of a no package condition where the height of the packages in magazine 11 reach a predetermined number. This could occur if the packer ahead of the wrapping machine rejects one or more packages so that the faster moving wrapping machine will deplete the stack of packages being supplied to the predetermined height.

Clutch 31 engages as soon as the predetermined stack height is established. Thus, conveyor chains 18 and 19 carrying pusher elements 17 forward in a one-to-one relationship are driven through drive chain 29 as shown. The auxiliary feed continues until such time that additional packages are brought into the magazine 11. When sensing device 30 again sense packages coming from the packer, brake assembly 32 is actuated and clutch 31 disengages thereby stopping the movement of packages $P_1$ from the auxiliary feed supply mechanism 16. Clutch device 31 and brake assembly 32 are well known devices and are shown to clarify the operation of the basic invention of the present case. Sensing device 30 may be a photoelectric apparatus or a proximity sensing device. Various sensing techniques may be used to maintain any desired stack condition in supply assembly 11.

The primary package supply can be brought to the first conveying assembly in various ways and the auxiliary supply of packages could be brought into the system in many different ways. The significance of this invention is the moving of articles in a direction transverse to the gravity feed direction of a first stack of articles before the next preceding article has been completely removed from the bottommost position in that stack. Thus, the article is placed beneath the stack without depleting the total number of articles in the stack. Generally, the maintaining of a stack of articles is necessary in this type of feeding operation. If the stack were completely depleted, feeding the package into the main supply is too dangerous because of the speed of the pushers operating underneath the gravity feed mechanism.

The assembly as described herein is a unit which may be added to existing wrapping machines to accomplish the desired results as disclosed and described herein. In prior art mechanisms, auxiliary packages are mechanically fed between the packer and the wrapper. However, the feeding of the auxiliary packages in the present invention takes place between an existing stack of packages coming from the packer and the wrapping machine.

While the auxiliary feed method and assembly have been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An assembly for providing a continuous supply of articles, said assembly comprising:
    (a) first supply means to gravity feed articles from a stack to an article introducing position located below the stack.
    (b) first conveying means for moving articles from the article introducing position to a subsequent working position, and
    (c) second conveying means for moving articles into the article introducing position immediately behind said first conveying means to insert an article beneath said stack while maintaining the total number of articles in said stack.

2. An assembly as defined in claim 1 wherein the second conveying means moves articles from an auxiliary article supply position to said article introducing position.

3. An assembly as defined in claim 2 wherein a second supply means provides articles to the auxiliary article supply position.

4. An assembly as defined in claim 1 wherein the articles to be fed to the article introducing position are maintained contiguously with respect to each other.

5. An assembly as defined in claim 1 wherein the first conveying means moves the articles along a path at spaced intervals with respect to each other from the article introducing position to said subsequent working position.

6. An assembly as defined in claim 1 wherein the first supply means includes means for maintaining the articles in said stack at a predetermined amount.

7. An assembly as defined in claim 6 wherein said article maintaining means includes means for sensing the absence of articles in the first supply means at a predetermined height therein.

8. An assembly as defined in claim 6 wherein means responsive to said maintaining means is provided to actuate the second conveying means to provide said article behind said first conveying means.

9. An assembly as defined in claim 1 wherein
said first conveying means includes first pushing means for contacting the bottommost article of the stack in said article introducing position to urge said article along a path to the subsequent working position, and
said second conveying means includes second pushing means to push another article into said article introducing position in timed relationship to prevent a further article from being fed by gravity from said stack.

10. An assembly as defined in claim 9 wherein
said first pushing means comprises a plurality of pusher members laterally spaced with respect to each other along said path,
said second pushing means being effective to insert an article between said laterally spaced pusher members of said first pushing means.

11. An assembly as defined in claim 10 wherein
said first conveying means includes first closed loop means for carrying said first pusher members,
said second conveying means includes second closed loop means and said second pushing means includes a plurality of pushing elements mounted at spaced intervals with respect to each other on said second closed loop means.

12. An assembly as defined in claim 11 wherein
said article maintaining means includes means for sensing the absence of articles in the first supply means at a predetermined height therein.

13. An assembly as defined in claim 12 wherein
means responsive to said sensing means is provided to actuate the second conveying means for inserting said article behind said first conveying means.

14. An assembly as defined in claim 1 wherein
a first supporting surface disposed in a first horizontal plane supports the bottommost article in said stack in said article introducing position, and
a second supporting surface disposed on a second horizontal plane supports the article being inserted behind said first conveying means,
said second horizontal plane is horizontal to and laterally spaced below said first horizontal plane.

15. An assembly as defined in claim 1 wherein
guide means causes the article being moved from the article introducing position to travel along a first path of movement and the article being inserted behind said first conveying means to travel along a second path of movement,
said first and second paths of movement being offset with respect to each other.

16. A method of providing a continuous supply of articles, said method comprising:
(a) providing a stack of articles,
(b) gravity feeding articles from said stack to an article introducing position located below the stack,
(c) moving articles from the article introducing position to a subsequent working position with first conveying means, and
(d) moving articles in a direction transverse to the gravity feed direction into the article introducing position before the next preceding article has been completely removed to insert an article beneath said stack without depleting the total number of articles in said stack.

17. A method as defined in claim 16 wherein
said articles are being inserted in said transverse direction at a location below a horizontal support plane which incorporates the article introducing position.

18. A method as defined in claim 16 wherein
the inserted articles are moved with second conveying means, and said operation of the second conveying means is synchronized with the operation of the first conveying means when a predetermined height of said stack is sensed.

19. A method as defined in claim 16 wherein
said articles are packages to be wrapped, and
said subsequent working position is in a wrapping work station.

* * * * *